United States Patent
Zhang et al.

(10) Patent No.: US 9,604,224 B2
(45) Date of Patent: Mar. 28, 2017

(54) SYSTEM AND METHOD FOR PROCESSING OBJECTS HAVING CONTAMINATING PARTICLES

(71) Applicant: Li Tong (H.K.) Telecom Company Limited, Fotan, N.T. (HK)

(72) Inventors: Lei Zhang, Hao (CN); Ming-Tong Wang, Shatin (HK)

(73) Assignee: LTG Green-Tech R&D Company Limited, Tortola (VG)

( * ) Notice: Subject to any disclaimer, the term of this patent is extended or adjusted under 35 U.S.C. 154(b) by 661 days.

(21) Appl. No.: 14/059,976

(22) Filed: Oct. 22, 2013

(65) Prior Publication Data

US 2014/0175197 A1  Jun. 26, 2014

(30) Foreign Application Priority Data

Dec. 21, 2012 (HK) .................................. 12113253

(51) Int. Cl.
| | |
|---|---|
| B02C 23/00 | (2006.01) |
| B02C 19/00 | (2006.01) |
| B02C 23/08 | (2006.01) |
| B02C 23/18 | (2006.01) |
| B02C 23/24 | (2006.01) |
| B03B 9/06 | (2006.01) |
| B09B 3/00 | (2006.01) |
| B29B 17/02 | (2006.01) |
| B29L 31/00 | (2006.01) |
| B29B 17/04 | (2006.01) |

(52) U.S. Cl.
CPC ...... *B02C 19/0056* (2013.01); *B02C 19/0081* (2013.01); *B02C 23/08* (2013.01); *B02C 23/18* (2013.01); *B02C 23/24* (2013.01); *B03B 9/061* (2013.01); *B09B 3/00* (2013.01); *B29B 17/02* (2013.01); *B29B 17/0412* (2013.01); *B29B 2017/0227* (2013.01); *B29B 2017/0272* (2013.01); *B29L 2031/7678* (2013.01); *Y02W 30/521* (2015.05); *Y02W 30/523* (2015.05); *Y02W 30/526* (2015.05); *Y02W 30/622* (2015.05); *Y02W 30/625* (2015.05)

(58) Field of Classification Search
CPC ...... B02C 23/10; B02C 23/24; Y02W 30/526; B09B 3/00; B29B 2017/0272
USPC ................................. 241/60, 65, 66, DIG. 14
See application file for complete search history.

(56) References Cited

U.S. PATENT DOCUMENTS

| | | | | | |
|---|---|---|---|---|---|
| 4,562,972 | A | * | 1/1986 | Hagiwara | B02C 2/10 241/162 |
| 5,004,165 | A | * | 4/1991 | Landa | B01F 7/00841 241/135 |
| 6,158,680 | A | * | 12/2000 | Ranne | B02C 17/16 241/171 |
| 6,630,277 | B2 | * | 10/2003 | Nakanishi | B02C 2/10 241/24.18 |
| 7,162,785 | B2 | * | 1/2007 | Koumura | B03B 9/061 241/24.1 |

(Continued)

*Primary Examiner* — Faye Francis
(74) *Attorney, Agent, or Firm* — Renner Kenner Greive Bobak Taylor & Weber

(57) ABSTRACT

A system and method for processing objects having contaminating particles includes the steps of shredding the objects in a shredding chamber to form a plurality of shredded fragments, wherein the shredding chamber is arranged to be substantially combustion resistant, and removing the contaminating particles from the plurality of shredded fragments.

19 Claims, 5 Drawing Sheets

(56) References Cited

U.S. PATENT DOCUMENTS

| | | | |
|---|---|---|---|
| 7,513,447 B2* | 4/2009 | Lee | B02C 19/066 |
| | | | 241/152.1 |
| 7,883,041 B2* | 2/2011 | Ishikawa | B02C 17/161 |
| | | | 241/171 |
| 2013/0186991 A1* | 7/2013 | Tabata | G03G 15/104 |
| | | | 241/60 |

* cited by examiner

SYSTEM AND METHOD FOR PROCESSING OBJECTS HAVING CONTAMINATING PARTICLES

TECHNICAL FIELD

The present invention relates to a system and method for processing objects having contaminating particles and particularly, although not exclusively, to objects which have toner particles.

BACKGROUND

Printers and photocopiers have made modern day printing a relatively simple task. Due in part to recent advances in the areas of printing and photocopying technologies, accessibility of printers and photocopiers have increased significantly for businesses and consumers, with printers and photocopiers now being priced at almost disposable prices.

However, despite the advances in printing and photocopying technologies, waste products from printing and photocopying devices are becoming a greater environmental concern. Particularly, in view of the relative ease in which devices are now accessible to consumers, many of the wastes such as old devices, printer heads or colouring cartridges are becoming a major environmental concern.

Part of these environmental concerns is derived from the fact toner particles used by these printers and copiers as a printing or colour agent is highly toxic and unsafe. There are reports of toner being carcinogenic and its escapement into the environment is highly toxic to humans and wildlife. In addition, as toner is often found as a "charged" particle, it is also readily able to contaminate items in which it is stored in or environments in which it is found.

SUMMARY OF THE INVENTION

In accordance with a first aspect of the present invention, there is provided a method for processing objects having contaminating particles comprising the steps of shredding the objects in a shredding chamber to form a plurality of shredded fragments, wherein the shredding chamber is arranged to be substantially combustion resistant; and removing the contaminating particles from the plurality of shredded fragments.

In an embodiment of the first aspect, the shredding chamber is cooled.

In an embodiment of the first aspect, the shredding chamber is cooled by a heat exchanging arrangement.

In an embodiment of the first aspect, the heat exchanging arrangement includes a circulation of a coolant around the shredding chamber.

In an embodiment of the first aspect, the coolant is water.

In an embodiment of the first aspect, the shredding chamber is arranged to be at least partially filled with a non flammable substance.

In an embodiment of the first aspect, the non flammable substance is pumped into the shredding chamber.

In an embodiment of the first aspect, the non flammable substance is nitrogen gas.

In an embodiment of the first aspect, the contaminating particles are removed from the shredded fragments by suction pressure.

In an embodiment of the first aspect, the suction pressure is delivered by a vacuum motor via a suction channel.

In an embodiment of the first aspect, the suction channel is filtered to collect the contaminating particles.

In an embodiment of the first aspect, the suction channel is filtered by a filter member disposed between the suction channel and the vacuum motor.

In an embodiment of the first aspect, the filter member is arranged to prevent the contaminating particles from contacting the vacuum motor.

In an embodiment of the first aspect, the filter member is arranged to collect the contaminating particles into one or more collection bags.

In an embodiment of the first aspect, the contaminating particles are toner particles.

In an embodiment of the first aspect, the objects having contaminating particles are toner cartridges.

In an embodiment of the first aspect, the embodiment further comprises the step of removing one or more metallic members from the shredded fragments.

In an embodiment of the first aspect, the one or more metallic members are removed by an electro-magnetic sorter arranged to detect and collect the metallic members from the shredded fragments.

In an embodiment of the first aspect, the embodiment further includes the step of disturbing the shredded fragments to remove the contaminating particles.

In an embodiment of the first aspect, the shredded fragments are disturbed by an application of vibrating forces.

In an embodiment of the first aspect, the step of disturbing the shredded fragments is applied in combination with the step of removing the contaminating particles from the shredded fragments by suction pressure.

In accordance with a second aspect of the present invention, there is provided a system for processing objects having contaminating particles comprising a shredding module arranged to shred the objects in a shredding chamber to form a plurality of shredded fragments wherein the shredding chamber is arranged to be substantial combustion resistant and a particle removing module arranged to remove the contaminating particles from the plurality of shredded fragments.

In an embodiment of the second aspect, the shredding chamber is cooled.

In an embodiment of the second aspect, the shredding chamber is cooled by a heat exchanging arrangement.

In an embodiment of the second aspect, the heat exchanging arrangement includes the circulation of a coolant around the shredding chamber.

In an embodiment of the second aspect, the coolant is water.

In an embodiment of the second aspect, the shredding chamber is arranged to be at least partially filled with a non flammable substance.

In an embodiment of the second aspect, the non flammable substance is pumped into the shredding chamber.

In an embodiment of the second aspect, the non flammable substance is nitrogen gas.

In an embodiment of the second aspect, the contaminating particles are removed from the shredded fragments by suction pressure.

In an embodiment of the second aspect, the suction pressure is delivered by a vacuum motor via a suction channel.

In an embodiment of the second aspect, the suction channel is filtered to collect the contaminating particles.

In an embodiment of the second aspect, the suction channel is filtered by a filter member disposed between the suction channel and the vacuum motor.

In an embodiment of the second aspect, the filter member is arranged to prevent the contaminating particles from contacting the vacuum motor.

In an embodiment of the second aspect, the filter member is arranged to collect the contaminating particles into one or more collection bags.

In an embodiment of the second aspect, the contaminating particles are toner particles.

In an embodiment of the second aspect, the objects having contaminating particles are toner cartridges.

In an embodiment of the second aspect, the embodiment further comprises a metallic sorter arranged to remove one or more metallic members from the shredded fragments.

In an embodiment of the second aspect, the metallic sorter is arranged to remove the metallic members by applying an electro-magnetic force arranged to detect and collect the metallic members from the shredded fragments.

In an embodiment of the second aspect, the embodiment further includes a vibration module arranged to disturb the shredded fragments to remove the contaminating particles.

In an embodiment of the second aspect, the shredded fragments are disturbed by an application of vibrating forces delivered by the vibration module.

In an embodiment of the second aspect, the shaker module is arranged to operate in combination with the vacuum motor to remove the contaminating particles from the shredded fragments by suction pressure.

In accordance with a third aspect of the present invention, there is provided a method for processing toner cartridges with toner particles comprising the steps of shredding the toner cartridges in a chamber arranged to be substantially combustion resistant to form a plurality of shredded fragments, removing one or more metallic members from the shredded fragments, removing toner particles from the shredded fragments by disturbing the shredded fragments and sucking the toner particles from the shredded fragments.

In an embodiment of the third aspect, the step of removing toner particles from the shredded fragments uses a suction system with a filter arrangement arranged to prevent toner particles from entering a vacuum motor of the suction system.

In accordance with a fourth aspect of the present invention, there is provided a system for processing toner cartridges with toner particles comprising a shredder module arranged to shred the toner cartridges in a chamber arranged to be substantially combustion resistant to form a plurality of shredded fragments, a metallic sorted arranged to remove one or more metallic members from the shredded fragments, a particle removing module arranged to remove toner particles from the shredded fragments by disturbing the shredded fragments and using a suction pressure to suck the toner particles from the shredded fragments.

In an embodiment of the fourth aspect, the particle removing module includes a suction system with a filter arrangement arranged to prevent toner particles from entering a vacuum motor of the suction system.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
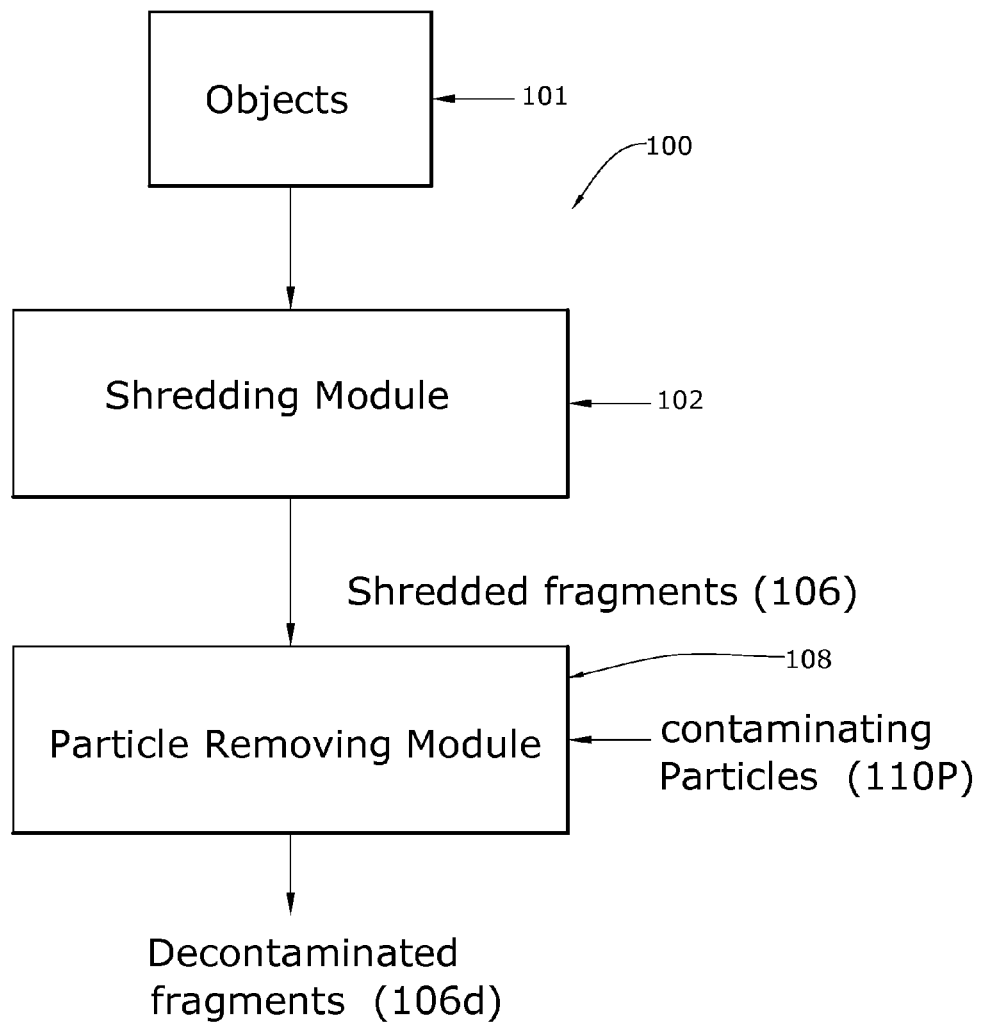
FIG. 1 is a block diagram of a system for processing objects having contaminating particles in accordance with one embodiment of the present invention.

With reference to FIG. 1, there is shown a system for processing objects having contaminating particles 100 comprising a shredder module 102 arranged to shred a plurality of objects 101 in a shredding chamber 104 to form a plurality of shredded fragments 106, wherein the shredding chamber 104 is arranged to be substantially combustion resistant; and, a particle removal module 108 arranged to remove the contaminating particles 110$p$ from the plurality of shredded fragments 106.

In this embodiment the system for processing objects having contaminating particles 100 includes a shredder module 102 which is arranged to receive objects such as used toner cartridges or other items or waste and shred or cut these objects into small shredded fragments. As toner cartridges are usually composed of a housing made from a plastic material with various pieces of metallic components such as springs, rods or hooks to assist in the operation of the cartridge during its useful life and an amount of unused toner particles, the shredder module 102 when shredding the toner cartridges may generate shredded fragments which include plastic or non-metallic fragments and metallic fragments which will be contaminated by the residual toner particles found in used toner cartridges. In this embodiment, the shredder module includes a cooling system which is described with reference to FIG. 2 below. The cooling system is arranged to cool the shredder in operation as well as to maintain a combustion resistant environment in the shredder chamber to minimize the chances of combusting the contaminating particles.

Preferably, when the system 100 is used for the processing of used toner cartridges, the toner cartridge may be firstly disposed into the shredder module to be shredded into multiple shredded fragments. These shredded fragments may include plastic or metallic fragments which may be substantially contaminated with toner particles which would have been found in the used toner cartridges. Once the shredded fragments are formed by the shredder module, the shredded fragments are delivered to the particle removal module 108.

Figure 3:
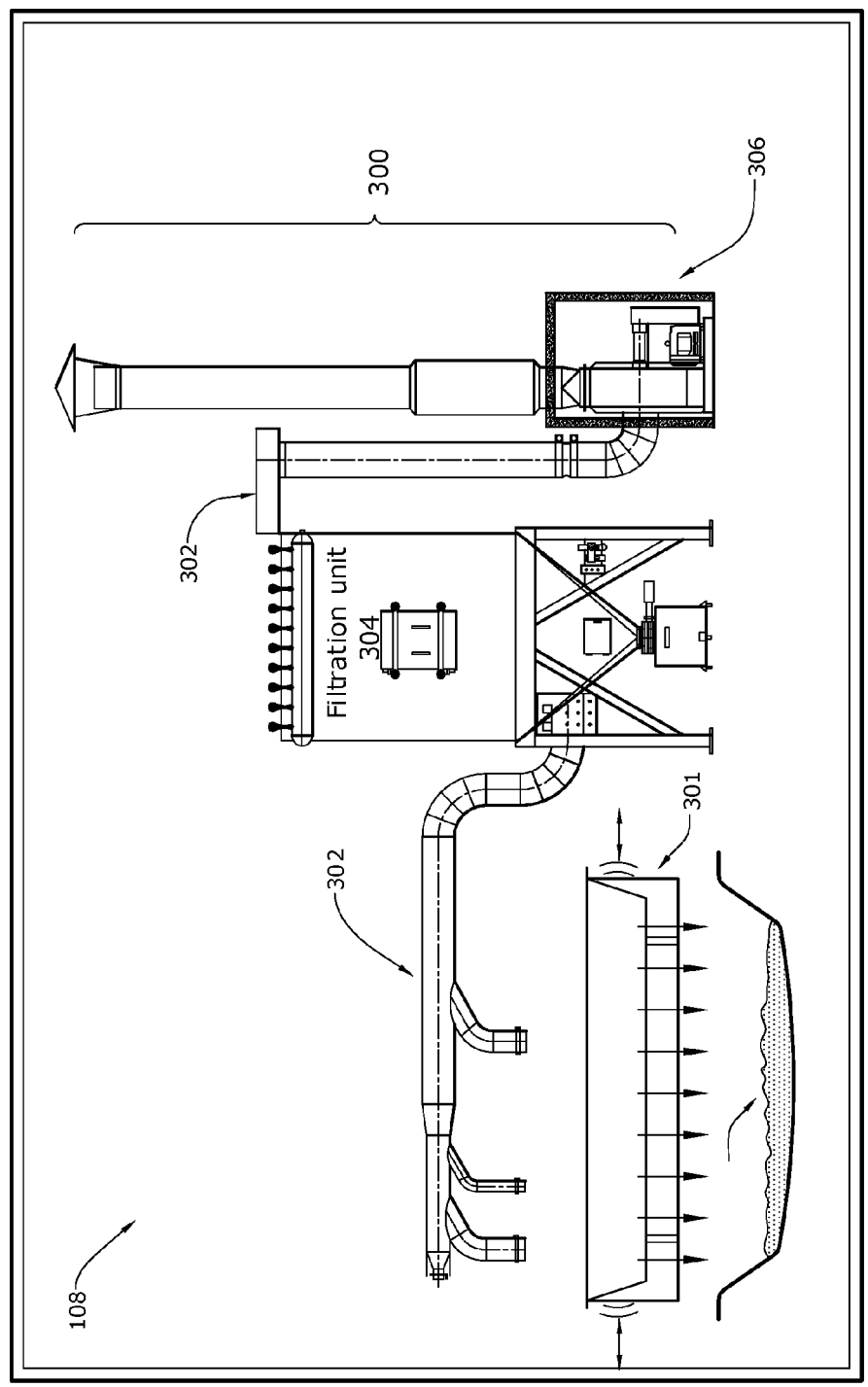
FIG. 3 is a side view of a particle removing module in accordance with the system for processing objects having contaminating particles of FIG. 1.

In this embodiment, the particle removal module 108 is arranged to receive the shredded fragments which may be contaminated with contaminating particles including toner particles from the cartridges. Once these shredded fragments are received the particle removal module 108, which may also be referred to as a particle gathering unit is arranged to substantially separate and gather the contaminating particles from the shredded fragments. With reference to FIG. 3, there is illustrated a diagram of one embodiment of the particle removal module 108 which is arranged to include a suction module arranged to provide suction pressure so as to remove the contaminating particles 110P from the shredded fragments and to collect or gather these particles 110P in one or more collection containers. In another embodiment, a vibrating apparatus is provided to disturb the shredded fragments 106 so that the contaminating particles 110P can be loosened from the shredded fragments 106 and be removed from the shredded fragments 106.

Once the particle removal module 108 has completed the particle removal process, the shredded fragments 106 remaining from the process may be collected for further processing, recycling or disposal. This is now possible as the contaminating particles, such as toner particles, have been substantially removed when processing used toner cartridges. This is advantageous in that the shredded fragments 106 are now effectively decontaminated and will no longer, or at least substantially less so, be toxic to the environment or pose a health hazard.

Figure 2:
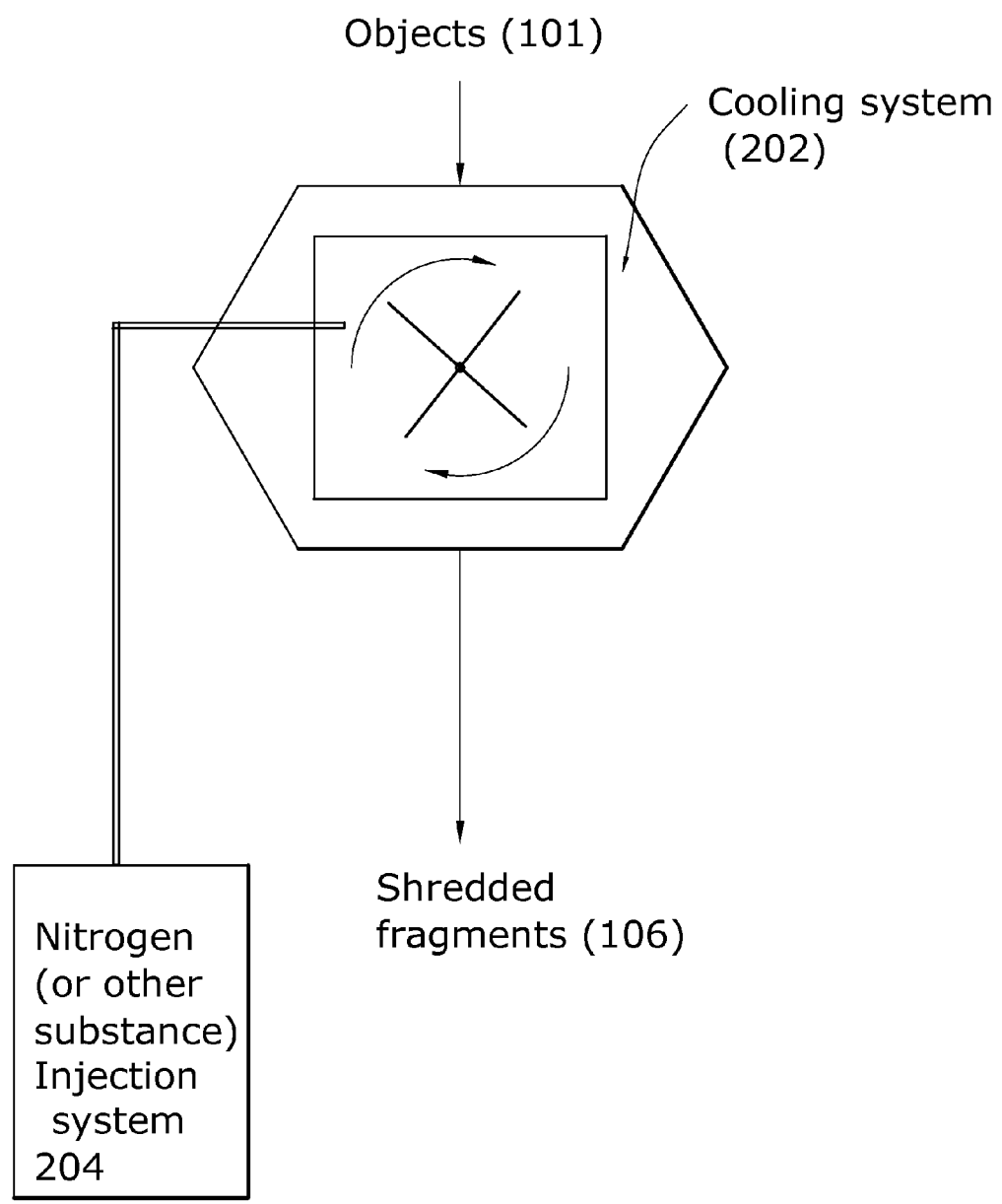
FIG. 2 is a block diagram of a shredder module of the system for processing objects having contaminating particles of FIG. 1.

With reference to FIG. 2, there is shown an embodiment of the shredder module 102 which is in use for the system for processing objects having contaminating particles 100 of FIG. 1. In this embodiment the shredder module comprises a two axis shredder which is housed within a chamber to define a shredding chamber 104. In one example, the two axis shredder may comprise a plurality of blades arranged to rotate in multiple directions to effectively cut any objects 101 which are placed within the shredding chamber so as to produce smaller pieces of shredded fragments 106. In use, as an example where the objects 101 are toner cartridges, the contaminating particles 110P will include toner particles which may be flammable or combustive. As toner particles have unique properties so as to allow its use in printing and photocopying, the chemical composition of toner particles render each particle to be flammable. Accordingly, as heat is generated during the shredding process, any heat which is applied to the toner particle may lead to a combustion effect.

In order to minimize the chances of inducing a combustion process within the shredding chamber 104, the shredding chamber 104 is arranged to have a cooling system 202 which will actively cool the shredder module 102 during its shredding operations. Preferably, this cooling system 202 includes a heat exchange system whereby a coolant is used to cool the surfaces of the shredder module 102 such as the inner walls of the shredder module 102 and the shredding chamber 104 whilst avoiding wetting or increasing the moisture to the objects 101, the shredded fragments 106 or the contaminating particles 110P as the shredded fragments 106, once wet, may render it more difficult to separate the contaminating particles 110P.

The inclusion of a cooling system to the shredder is advantageous as heat which is generated by the shredding process can be effectively removed through this heat exchange system. In one embodiment the heat exchange system comprises a circulation of water or other form of coolant around the external face of the internal walls of the shredder and in so doing cool the temperature within the shredding chamber.

To increase the cooling of the temperature inside the shredding chamber 104, the cooling system 202 may further include a module arranged to pump or inject a substance within the shredding chamber 104 so as to achieve a cooling effect or increase the combustion resistance of the chamber 104. Preferably, a non-flammable or non-combustible gas may be pumped or injected into the chamber 104 to reduce the likelihood of combustion due to the heat generated by the shredding process. One example of such a substance is nitrogen gas which can be injected into the chamber to discourage combustion since nitrogen is non flammable. When nitrogen is injected into the chamber 104, the nitrogen effectively eliminates the possibility of combustion as the oxygen content of the air within the chamber 104 will be far lower than normal air. In addition, nitrogen is a relatively abundant gas which can be purchased at low costs and its injection into the chamber will result in further cooling of the shredding chamber 104 without increasing the moisture of the shredded fragments or the contaminating particles. This is advantageous in that an increase in moisture for both the contaminating particles 110P and the shredded fragments 106 will render further difficulties in removing the contaminating particles 110P from the shredded fragments 106.

With reference to FIG. 3, there is illustrated an embodiment of the particle removing module 108. In this embodiment, the particle removing module 108 includes a suction unit 300 which is arranged to provide a suction pressure to remove the contaminating particles 110P. As shown in this illustration, the suction unit includes a suction channel 302 which is arranged to deliver suction pressure to a specific space where suction pressure is required.

In this example, the suction unit 302 includes a vacuum motor 306 which is arranged to drive the airflow within the suction unit 302 to produce the suction pressure. Disposed between the vacuum motor 306 and the suction channel is a filtration unit 304 which in this embodiment, is arranged to collect the contaminating particles which have been sucked through the suction channel.

In some examples, the filtration unit serves two individual purposes. Firstly, the filtration unit 304 is arranged to collect the contaminating particles into a single point for extraction. This may include one or more suction bags which can then be emptied once it is filled with contaminating particles. The second purpose is that the filtration unit 304 is also arranged to ensure that the contaminating particles do not reach the vacuum motor 306. This is particularly advantageous in examples where the contaminating particles include toner particles which may be electrically conductive. As toner particles may be electrically conductive, should these particles reach a vacuum motor 306, damages due to short circuits may occur if these particles reach electrical contacts, coils, wires or control boards of the vacuum motor. Accordingly the filtration unit 304 may include a filtering system with a filtering membrane which has a diameter of less than 0.5 microns to ensure contaminating particles such as toner particles are not able to pass through the filter whilst allowing the airflow to be maintained by the vacuum motor 306 to create the necessary suction power to remove the contaminating particles.

As shown in FIG. 3, once the shredded fragments 106 are distributed to the particle removing module 108, the shredded fragments 106 are processed by a vibrating unit 301 and the suction unit 300. In this embodiment, the particle removing module 108 includes also a vibrating unit 301 which is arranged to operate in conjunction with the suction unit 300 of the particle removing module 108, although as a person skilled in the art would appreciate, the particle removing module 108 may include only a suction unit 300 or a vibrating unit 301 or both units 300, 301 which can operate individually or together in combination.

In this embodiment, the vibrating unit 301 is arranged to vibrate or apply oscillating forces to the shredded fragments. By disturbing the fragments with these vibration and oscillating forces, contaminating particles can effectively be loosened from the shredded fragments and separated from the fragments 106. Once separated, the particles may fall to the side or to a base of the vibration unit 301 for collection. Preferably, the vibration unit 301 includes a base portion which has a plurality of apertures which are sufficiently large for the contaminated particles to pass through whilst small enough to ensure the shredded fragments do not fall through. This results in a separation between the contaminating particles and the shredded components and both the shredded components and the contaminating particles can be collected at the base of the vibration unit 301.

Preferably, to maximize the particle removing module's 108 ability in removing contaminating particles 110P from the shredded fragments 106, both the vibration unit 301 and the suction unit 300 can be utilized in combination such that the loosened contaminating particles can be removed from the shredded fragments 106 via suction pressure and captured through the structure of the vibration unit 301. When both the suction unit 300 and the vibration unit 301 is in operation, a large portion of the contaminating particles can be removed from the shredded fragments 106, leaving the shredded fragments 106 to be substantially decontaminated.

Figure 4:
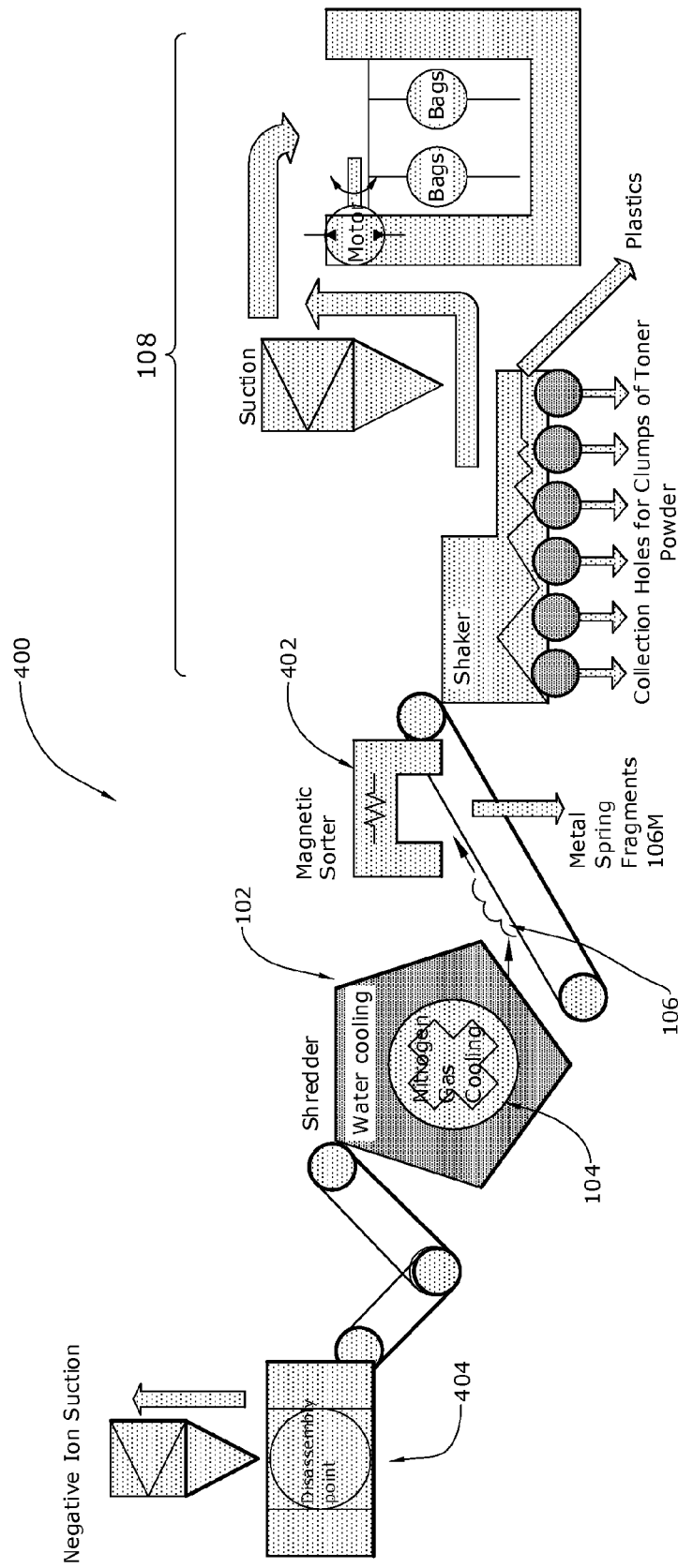
FIG. 4 is a schematic diagram of a system for processing objects having contaminating particles in accordance with another embodiment of the present invention.
Figure 5:
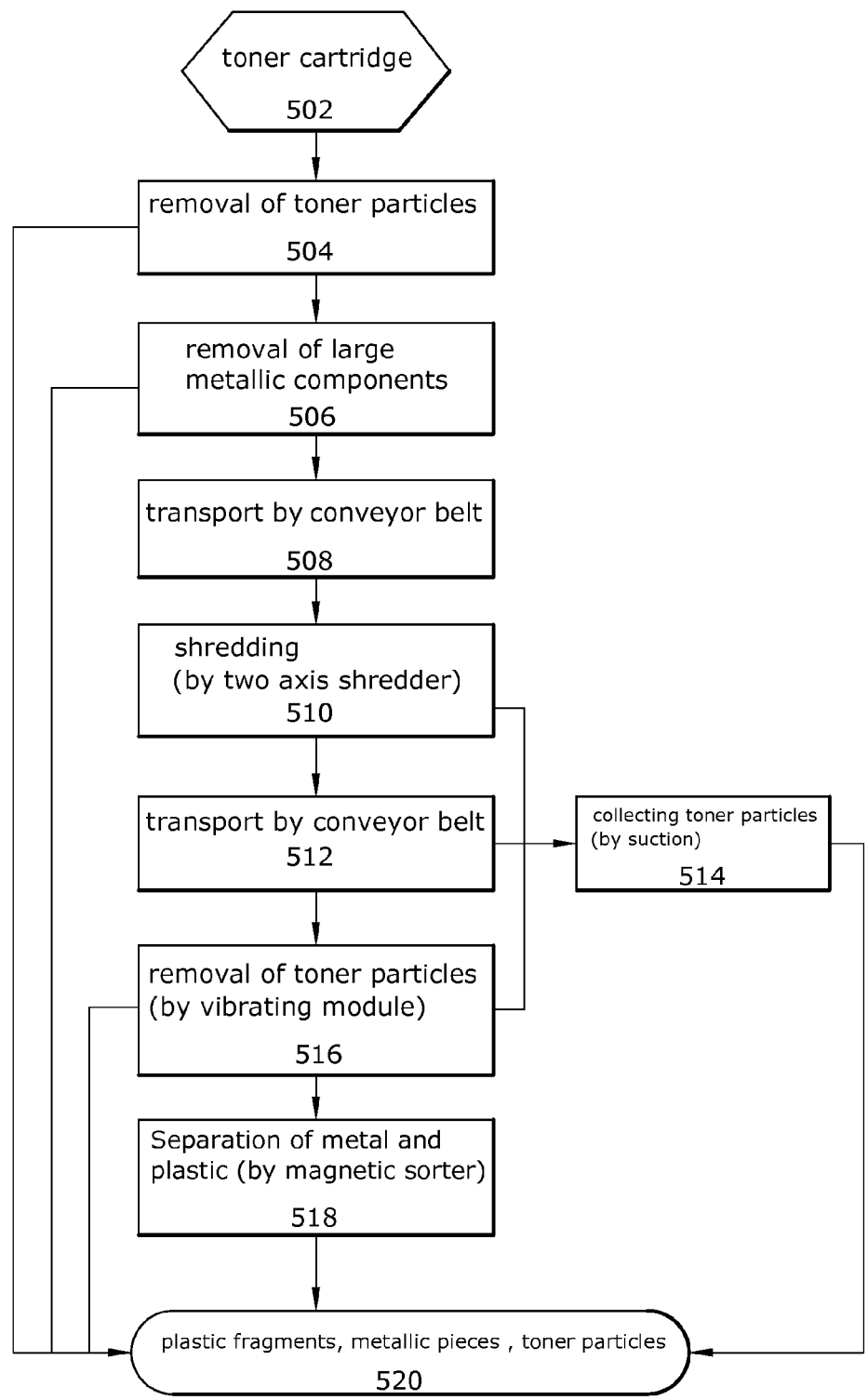
FIG. 5 is a process diagram illustrating the method steps for processing used toner cartridges having toner particles by the system of FIG. 4.

With reference to FIGS. 4 and 5, there is illustrated a schematic diagram of another embodiment of a system for processing objects having contaminated particles 400 (FIG. 4) and a flow diagram illustrating the processes in which a toner cartridge may be processed by this embodiment of the system 400. In this embodiment, the shredder module 102 and the particle removing module 108 are supplemented by a metallic sorter module 402 arranged to remove metallic fragments and a disassembly point 404 arranged to at least partially disassemble the objects in the processing of the objects having contaminating particles.

In this embodiment, when an object having contaminated particles such as a used toner cartridge is processed by the system 400, the object is firstly delivered to the disassembly point 404. At this stage of the process, the objects are partially disassembled by machinery or workers whereby the objects are partially disassembled or have larger steel and other metallic components removed from object. In the examples where the objects are used toner cartridges, the disassembly point 404 may include the process of removing major metallic components from the toner cartridges and/or partial separation or opening up of the cartridge. This is advantageous in that by including this process of removing larger metal components and partial separation or opening up of used toner cartridges, the shredder module 102 which follows in processing the objects can experience a reduced wear and tear to the shredder blades that may be caused by large metal components placed within the shredding chamber.

Preferably the removal process of these metallic components and opening up of the objects is conducted in a fully enclosed chamber with negative ion air suction to prevent any escapement of toner powder or particles into the environment. As negative ion suction, formed by suction pressure being from air that has been charged with negative ions is likely to react with the electrostatic properties of toner particles, the suction may be more effective at removing escaping toner particles than normal suction pressure.

Once these objects have been disassembled or processed to remove larger metallic components at the disassembly point 404, the objects may then be shredded by the shredder module 102 as described with reference to FIGS. 2 and 3. By injecting nitrogen into the shredding chamber 104 as well as the inclusion of a coolant such as water to reduce the heat generated from the shredder module 102, the shredding chamber 104 in use will then be rendered substantially combustion resistant. This is advantageous in that the risk of fire or combustion of contaminating particles such as toner particles would be substantially reduced and in turn, supports the shredder in shredding more objects at the same time, which increases the processing capacity of the system 400.

Once the shredded fragments 106 are released by the shredder, the fragments 106 may be disposed onto a conveyor belt to be transported to the particle removal module 108. Whilst being transported, a magnetic sorter module 402 can be used to separate smaller metallic fragments from the shredded components. These metallic fragments 106M may include smaller spring members, rods, hooks or screws which would not have been removed in the original disassembling process 404. By removing these metallic fragments, the purity of the plastics which are used for the objects can then be increased for subsequent disposal or further recycling. In one example, the magnetic sorter module 402 may operate by use of electromagnetic components such as an electromagnet roller or similar type of components which are arranged to use the magnetic properties of metallic fragments for separating the metallic fragments from the non-metallic fragments. This is particularly advantageous in processing toner cartridges as a majority of toner cartridges are made from a plastic container, housing or body and thus by removing these metallic fragments, the plastics of the containers, housing or body can be melted for recycling purposes without the mixture of metallic components.

Once the magnetic sorter module 402 completes the removal of metallic fragments, the remaining shredded fragments 106 are then delivered by a conveyor belt to the particle removing module 108 which includes in this embodiment a vibration unit 301 and a suction unit 300 as described with reference to FIG. 3. Once the particle removing module 108 removes the contaminating particles, the shredded fragments 106 are effectively decontaminated as a majority of these contaminating particles have been removed and collected elsewhere. Thus, according to the system 400, once the object has been processed, metallic components, non metallic components and contaminating particles are separated and collected for further processing, recycling or disposal. When used with a used toner cartridge, upon the completion of processing by system 400, the shredded plastic fragments, metallic components and used toner particles can be separated for collection and further processing, and thus have removed the environmental impact of used toner cartridges.

With reference to FIG. 5 there is provided a process diagram which illustrates the processes in which used toner cartridges are processed in accordance with the system 400 for processing objects having contaminating particles 110P as shown in FIG. 4. Initially one or more used toner cartridges are provided to the disassembly point 404 whereby a machine or workers are arranged to remove large metallic components from each of the toner cartridges (506). In this particular step, the removal process may include a disassembly of the toner cartridge to minimize the wear and tear which will occur in the shredder module 102. To minimize the escapement of toner particles, negative ion suction may be provided in a chamber where the disassembly is to take place to ensure escaping toner particles which escaped during the disassembling process will be substantially captured (504).

Once this is completed, a conveyor belt may be used to deliver the disassembled cartridges to the shredder module 102 which in this embodiment is a two axis shredder that has been filled and pumped with nitrogen gas to keep the shredding chamber cool 508, 510. The shredder module 102 is arranged to shred the disassembled toner cartridges into multiple shredded fragments 106 such as fragments of plastic or metal which were used to manufacture the toner cartridge. Upon the completion of this process a conveyor belt may deliver these shredded components to a particle removing module 108, 512. However, during its transportation, a metallic sorter module 402 is arranged to detect and separate metallic fragments from the shredded fragments 106 on the conveyor belt so as to further separate the metallic fragments from the shredded fragments 106, which in the case of toner cartridges will largely be plastics fragments 518.

Once metallic fragments are separated, the shredded fragments 106 will enter the particle removing module 108 which includes the vibrating module 301 arranged to disturb each of the shredded fragments 106 so that toner particles can be loosened from the surfaces of each of the shredded components 516. Once loosened, the toner particles may fall to the bottom of the vibrating module 301 which includes a net or a similar filtration structure which is sufficiently large such that toner particles are able to fall to the bottom of the shaker whilst the shredded fragments 106 remain on the conveyor belt. Preferably in addition to the disturbances through the vibration and oscillation forces of the vibration unit 301, a suction unit 300 as described with reference to FIG. 3 is also used in combination with the vibration unit 301 to suck away any loosened toner particles 514. These toner particles may then be collected in a filtration bag or a filtration membrane and further disposed of separately.

Alternatively, the separation of metallic fragments 518 can be carried out after the toner particles removal process 516 as shown in FIG. 5.

The end result of this process is that the toner cartridges can be separated into three major components, the first being metallic pieces which can then be recycled, whilst the major components which define the housing of these cartridges such as plastic and various pieces of plastics can then be separated and decontaminated from the residual toner particles which may be found in these used toner cartridges 520. By decontaminating the core constituents of the cartridges, the system 400 is able to reduce the impact of contaminating toner particles from escaping into the environment whilst also allowing these plastic and metallic fragments to be recycled through normal means.

Preferably, each of these stages of recycling, disassembling 404 shredding, metallic fragment removal by the metallic sorter module 402 and particle removal by the particle removal module 108 (suction unit 300 and vibration module 301) are all modular in that the system 400 can include any one of each of these stages or remove one or more of these stages to process objects with contaminating particles. As an example, the vibration module 301 may not be necessary in certain types of processing. In certain examples the disassembly of the object in the first instance 404 or the vibration module 301 or the magnetic sorter module 402 might not be necessary depending on the objects that are currently being processed. In other examples the shredder module 102 or the suction unit 300 might not be necessary depending on the size of the contaminating particles. In addition to these advantages due to the modular structure of the system 400 for processing objects with contaminating particles 110P, each of these units can be adjusted accordingly based on the volume of the objects to be processed. For example, multiple shredder modules 102 or multiple vibration modules 301 and suction modules 300 may be used in the system depending on the nature and volume of the objects which are being processed.

These embodiments are advantageous in that toner particles which are found in toner cartridges may be processed without escapement whilst also ensuring the hazardous nature of toner particles being combustible and electrically conductive will not cause any major concerns with the shredder unit and the suction unit.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for processing objects containing flammable particles, comprising:
    a shredder unit having:
        a shredder with a shredding chamber for receiving objects containing flammable particles, and one or more blades in the shredding chamber for shredding the objects into a plurality of shredded fragments;
        a cooling system for providing a coolant on or around an external surface of the shredder during operation; and
        an injection system for injecting a non-flammable gas into the shredding chamber during operation; and
    a particle removal unit having:
        a vibration unit with a base portion for holding the plurality of shredded fragments, the base portion having a plurality of apertures through which the flammable particles can pass under gravity, wherein the vibration unit vibrates during operation so as to remove at least some of the flammable particles from the plurality of shredded fragments; and
        a suction unit having a suction channel with an opening, and a suction motor for creating suction pressure in the suction channel; wherein during operation suction pressure created by the suction motor removes at least some of the flammable particles from the plurality of shredded fragments adjacent the opening.

2. The system of claim 1, wherein the shredder is a two axis shredder.

3. The system of claim 1, wherein the coolant is water.

4. The system of claim 1, wherein the non-flammable gas is nitrogen.

5. The system of claim 1, wherein the suction unit further comprises a filtration unit disposed upstream of the suction motor and downstream of the opening for collecting flammable particles.

6. The system of claim 1, further comprising a transport system between the shredder unit and the particle removal unit, wherein the transport system transports the plurality of shredded fragments from the shredder unit to the particle removal unit.

7. The system of claim 6, wherein the transport system comprises a conveyor belt.

8. The system of claim 1, further comprising a magnetic sorter with an electromagnetic component for attracting metallic fragments in the plurality of shredded fragments so as to remove the metallic fragments from the plurality of shredded fragments.

9. The system of claim 8, wherein the electromagnetic component comprises an electromagnet roller.

10. The system of claim 8, wherein the magnetic sorter is between the shredder unit and the particle removal unit.

11. The system of claim 1, further comprising an enclosed chamber with negative ion air suction, in which the objects are disassembled.

12. The system of claim 11, further comprising a transport system for transporting the objects from the enclosed chamber to the shredder unit.

13. The system of claim 12, wherein the transport system comprises a conveyor belt.

14. The system of claim 1, wherein the objects are toner cartridges.

15. The system of claim 1, wherein the flammable particles are toner particles.

16. A system for processing toner cartridges containing toner particles, comprising:
   a shredder unit having:
      a shredder having a shredding chamber for receiving toner cartridges containing toner particles, and one or more blades in the shredding chamber for shredding the toner cartridges into a plurality of shredded fragments;
      a cooling system for providing a coolant on or around an external surface of the shredder during operation; and
      an injection system for injecting a non-flammable gas into the shredding chamber during operation; and
   a particle removal unit having:
      a vibration unit with a base portion for holding the plurality of shredded fragments, the base portion having a plurality of apertures through which the toner particles can pass under gravity, wherein the vibration unit vibrates during operation so as to remove at least some of the toner particles from the plurality of shredded fragments; and
      a suction unit having a suction channel with an opening, and a suction motor for creating suction pressure in the suction channel; wherein during operation suction pressure created by the suction motor removes at least some of the toner particles from the plurality of shredded fragments adjacent the opening.

17. The system of claim 16, wherein the coolant is water.

18. The system of claim 16, wherein the non-flammable gas is nitrogen.

19. The system of claim 16, further comprising a transport system between the shredder unit and the particle removal unit, wherein the transport system includes a conveyor belt for transporting the plurality of shredded fragments from the shredder unit to the particle removal unit.

* * * * *